United States Patent [19]

Ikeya

[11] Patent Number: 4,505,657
[45] Date of Patent: Mar. 19, 1985

[54] APPARATUS FOR FORMING BLOWN FILMS

[75] Inventor: Nobushige Ikeya, Tokyo, Japan

[73] Assignee: Mitsubishi Kasei Kogyo Kabushiki Kaisha, Tokyo, Japan

[21] Appl. No.: 624,791

[22] Filed: Jun. 26, 1984

Related U.S. Application Data

[63] Continuation of Ser. No. 436,366, Oct. 25, 1982, abandoned.

[30] Foreign Application Priority Data

Oct. 30, 1981 [JP] Japan .................................. 56-174350
Jul. 21, 1982 [JP] Japan .................................. 57-127058

[51] Int. Cl.³ .............................................. B29C 25/00
[52] U.S. Cl. ................................ 425/72 R; 425/326.1; 264/237; 264/564
[58] Field of Search ................... 425/72 R, 326.1, 143; 264/568, 569, 565, 566, 564, 237, 348, 169

[56] References Cited

U.S. PATENT DOCUMENTS

| | | | |
|---|---|---|---|
| 3,507,006 | 4/1970 | Princen | 264/237 |
| 3,568,252 | 3/1971 | Masuda et al. | 425/326.1 |
| 3,835,209 | 9/1974 | Karabedian | 264/237 |
| 3,888,609 | 6/1975 | Saint Eve et al. | 425/72 R |
| 4,259,047 | 3/1981 | Cole | 264/565 |
| 4,272,231 | 6/1981 | Schott, Jr. | 425/72 R |
| 4,330,501 | 5/1982 | Jones et al. | 425/72 R |
| 4,373,273 | 2/1983 | Church | 425/326.1 |

FOREIGN PATENT DOCUMENTS 137261  11/1978  Japan .............................. 425/378 R Primary Examiner—Jay H. Woo
Assistant Examiner—Timothy W. Heitbrink
Attorney, Agent, or Firm—Oblon, Fisher, Spivak, McClelland & Maier

[57] ABSTRACT

In apparatus for forming an inflation film of the type wherein a molten resin is ejected through a circular slit of a die, gas is blown into a resulting cylindrical film for inflating the film, and the cylindrical film is cooled by air ejected by an air ring, the air ring comprises an outer lip and an inner lip disposed closer to the die than the outer lip. The outer and inner lips form an air passage terminated with an air ejecting port, and the inner diameter of the outer lip increases in the direction of withdrawal of the cylindrical film. The air pressure in a space between the outer lip and the cylindrical film is reduced by Venturi tube effect or an evacuation device.

24 Claims, 7 Drawing Figures

APPARATUS FOR FORMING BLOWN FILMS

This application is a continuation of application Ser. No. 436,366 filed Oct. 25, 1982 and now abandoned.

BACKGROUND OF THE INVENTION

This invention relates to apparatus for forming blown films, and more particularly apparatus for forming blown films capable of stabilizing bubbles, and enabling high speed film forming as well as a high blow-up ratio, thereby to form at high efficiencies films highly transparent and having uniform thickness.

Heretofore, a blown film has been formed by extruding a molten resin through a die having a circular slit and blowing air into a cylindrical film thus formed to bulge or inflate the same.

It has been also known in the art to cool the cylindrical film extruded through the die by an air ring disposed near the die.

The prior art apparatus described above cannot be used for high speed forming and high blow-up forming because it cannot sufficiently stabilize the bubbles.

With such prior art apparatus it has been extremely difficult to form blown films by using thermoplastic synthetic resins having a low tension under molten state, such as high density polyethylenes having a density of at least 0.94 and linear low density polyethylenes, etc. calling attentions in recent years.

SUMMARY OF THE INVENTION

It is therefore an object of this invention to provide apparatus for forming blown films capable of forming blown films at high speeds and at high blow-up rate by using high density polyethylenes, linear low density polyethylenenes, etc.

Another object of this invention is to provide an improved apparatus for forming blown films having an air ring of a novel construction.

According to this invention, there is provided apparatus for forming a blown film comprising a blown film forming die having a circular slit, an air ring surrounding the circular slit of the die and provided with an air ejecting port, the air ejecting port being defined by an outer lip having a tapered surface, the inner diameter thereof increasing in a direction of withdrawal of a cylindrical film extruded through the circular slit and an inner lip disposed closer to the die than the outer lip, and means for reducing air pressure in a space between the inner lip and the cylindrical film.

DESCRIPTION OF THE PREFERRED EMBODIMENTS

Figure 1:
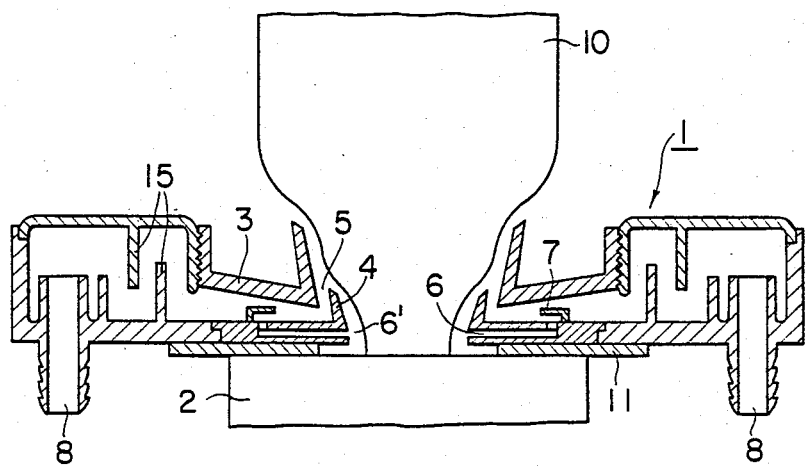
FIG. 1 is a longitudinal sectional view showing one example of the apparatus embodying the invention.

Before describing the inflation apparatus of this invention, thermoplastic synthetic resins that can be advantageously used in this invention will firstly be described. Among these resins may be mentioned olefin type resins such as polyethylenes, polypropylenes, ethylene-propylene copolymers, polybuthene 1, and ethylene-vinyl acetate copolymers; stylene type resins such as polystylenes, and acrylonitrile-butadiene-ethylene-copolymers; amid type resins such as nylon-6, nylon 6-6, nylon 6-10, nylon 11, and nylon 12; vinyl chloride type resins such as polyvinyl chlorides, polyvinylidene chlorides, and vinyl chloride-vinyl acetate chloride; and ester type resins such as polyethylene terephthalate, and polybuthylene telephthalate. Among these resins polyolefin type resins are most suitable. Polyethylenes having low deformation tension under molten state such as high density polyethylenes and linear low density polyethylenes are found more suitable.

The linear low density polyethylene is a copolymer of ethylene and other α-olefin which is different from low density polyethylene resins prepared by conventional high pressure method. As the other α-olefine may be used butene, hexene, octene, or decene. Such copolymer is prepared by using a Ziegler type catalyst or Phillips type catalyst utilized for a medium or low pressure method of preparing high density polyethylenes. The linear low density polyethylene has a short branch construction resulting from modifiying conventional high density polyethylene with a copolymerizing component and a density suitably decreased to about 0.91–0.95 g/cm$^3$ by utilizing short chain branches. The linear low density polyethylene has more excellent linearity of molecular chains than conventional high pressure low density polyethylene and much shorter branches than high density polyethylene.

Preferred embodiments of this invention will now be described with reference to FIGS. 1 through 7 in which identical or corresponding parts are designated by the same reference numerals.

As shown in FIG. 1, the blown film forming apparatus embodying the invention and shown in FIG. 1 comprises an air ring 1 mounted on a die 2 to surround a circular slit thereof as will be described later in more detail.

The air ring 1 is provided with an outer lip 3 and an inner lip 4, the inner surface of the outer lip 3 being tapered outwardly from its bottom—that is, in the direction of withdrawal of a cylindrical film 10 extruded from the circular slit of the die 2. The inner lip 4 is mounted on the die 2 to extend beneath the outer lip 3. It is advantageous that the inner surface of the inner lip 4 be enlarged outwardly in the same manner as the outer lip 3, but this construction is not essential.

An annular gap is defined between the outer and inner lips which acts as an air ejecting slit 5. The air ejecting slit 5 is open in the take out or withdrawal direction of the cylindrical film 10 so that the air ejected from the slit 5 flows smoothly through a space between the tapered inner surface of the outer lip 3 and the outer surface of the cylindrical film 10. By ejecting the cooling air in this direction, the air flows along the outer surface of the cylindrical film 10, so that even when a large quantity of air is ejected, a high cooling effect can be assured without deforming or vibrating the blown out cylindrical film.

An air suction passage 6 having an opening 6' is formed between the inner lip 4 and the die 2 so as to create a reduced pressure region between the cylindrical film 10 and the air ring 1 by sucking air through the air suction passage 6. To this end, air ring 1 and the die 2 are disposed not to form a large gap, which prevents decrease in the air pressure. Thus, usually, the air ring 1 is directly mounted on the die 2. Where it is desirable to adjust the position of the air ring 1, the thickness of a spacer 11 interposed between the air ring and the die may be varied.

The operation of the tapered surface and the reduced pressure region is as follows.

Figure 2:
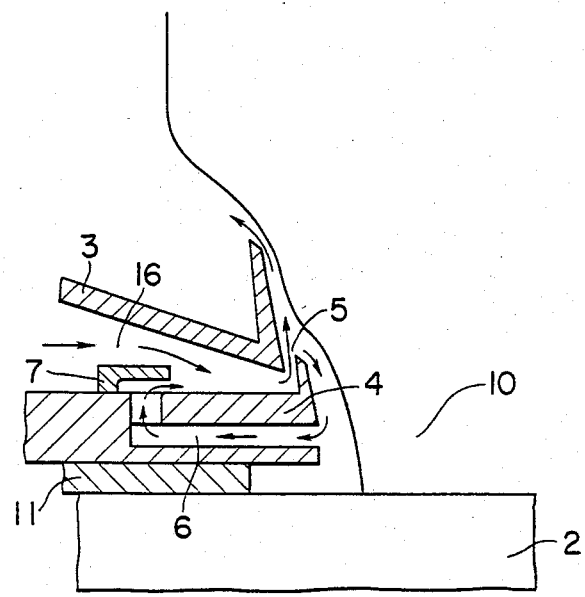
FIG. 2 is an enlarged longitudinal sectional view showing a portion of the apparatus shown in FIG. 1.
Figure 5:
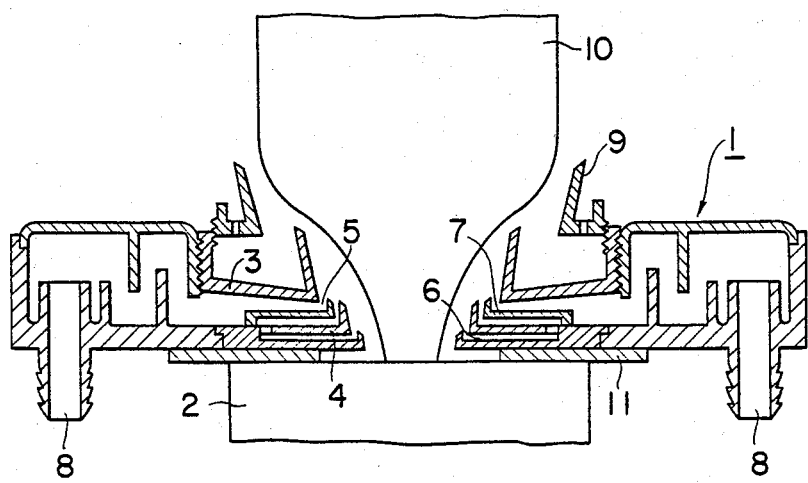
FIG. 5 is a longitudinal sectional view showing another embodiment of this invention.
Figure 6:
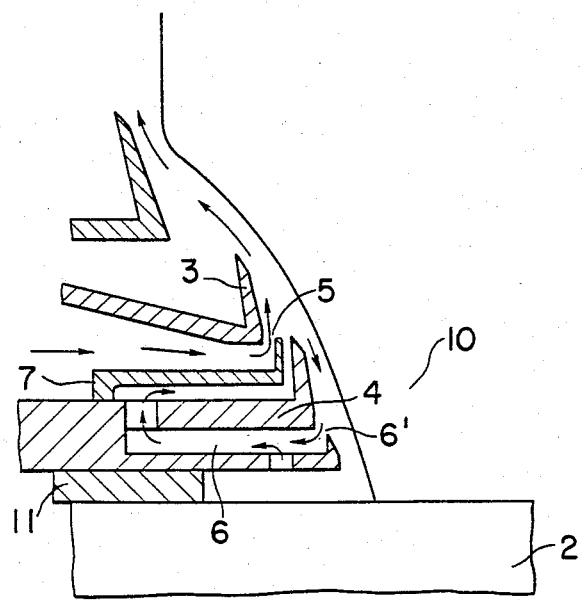
FIG. 6 is an enlarged sectional view showing a portion of the embodiment shown in FIG. 5.

Air admitted through an air inlet port 8 is rectified by annular baffle plates 15 and then sent to the air ejecting slit 5 from which the air flows upwardly above the air suction passage 6 opened in an air flow passage 16, as shown in FIG. 2. A pressure differential creating cover 7 is provided in the air flow passage 16 above one end of the passage 6 to reduce the pressure therein by Venturi tube effect caused by the cover 7, and the air flowing through air passage 16 thereby creates a reduced pressure region between the cylindrical film 10 and the inner lip 4. As shown in FIGS. 1 and 2, the length of the cover 7 may be short, but for the purpose of creating a stably reduced pressure state, it is advantageous to extend the cover 7 near the air ejecting slit 5, as shown in FIG. 5 and FIG. 6.

The air ejected through the air ejecting slit 5 is discharged to the outside after passing through a space between the cylindrical film 10 and the inner tapered surface of the outer lip 3.

The operation of this air flow acting upon the extruded cylindrical film 10 is a follows. First, the cylindrical film 10 extruded from the die 2 is attracted radially outwardly in the reduced pressure region. Accordingly, the cylindrical film 10 is moved upwardly with its diameter increased to some extent. Then, the diameter of the cylindrical film 10 is gradually increased while it moves upwardly along the tapered inner surface of the outer lip 3 and while being cooled by the air ejected from the air ejecting slit 5. Finally, the cylindrical film 10 is inflated to a desired diameter by the pressure of gas, e.g., air blown into the cylindrical film. The purpose of the rectifying plate 9 (shown in FIGS. 3 and 5–7) is to cause the air to flow along the periphery of the cylindrical film 10 as far as possile, thus stabilizing the cylindrical film 10.

More particularly, the diameter of the cylindrical film 10 is increased to some extent in the reduced pressure region immediately after it has been extruded through the die 2, and the diameter is increased further while the cylindrical film 10 is moving upwardly along the tapered inner surface of the outer lip 3. Increase in the diameter is considered to be caused by the fact that, since the gap between the tapered inner surface and the cylindrical film 10 is narrow, the pressure in the gap is reduced more or less by the Venturi tube effect with the result that the cylindrical film is attracted toward the tapered inner surface to increase the diameter.

If the pressure in the reduced pressure region were decreased excessively, the cylindrical film would come into contact with the inner lip 4, but the degree of pressure reduction can be adjusted to any suitable value by adjusting the spacing between the cover 7 and the opening of the air suction passage 6. Although the pressure in the reduced pressure region varies depending upon such factors as the type of the resin, a desired blow-up ratio, etc., usually a reduced pressure of 0.5–20 mm, more preferably 1–15 mm water column is advantageous. By adjusting the degree of pressure reduction and the quantity of the air ejected from the air ejecting slit 5, it is possible to create a downward flow of air between the air ejecting slit 5 and the air suction passage 6 through the gap between the inner lip 4 and the cylindrical film 10. This air flow acts as a protective film that prevents the cylindrical film 10 from contacting the inner lip 4. In the same manner, the air flowing between the outer lip 3 and the cylindrical film 10 prevents mutual contact thereof.

Figure 3:
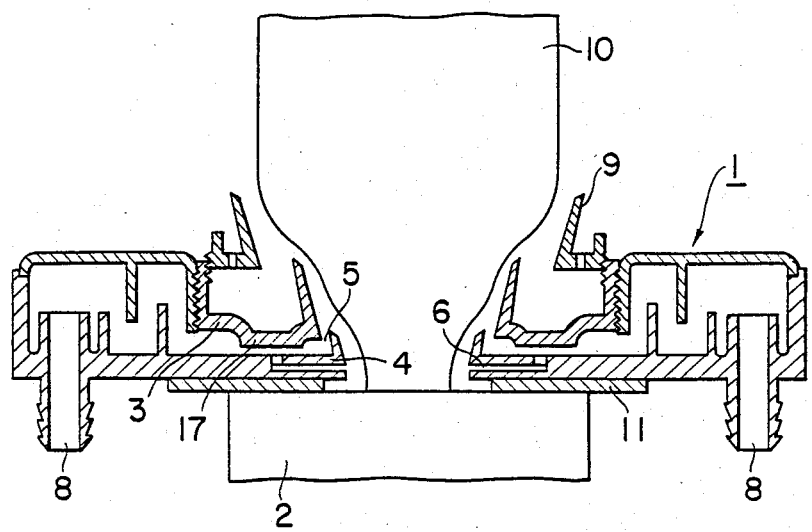
FIG. 3 and FIG. 4 are longitudinal sectional views showing other embodiments of this invention.

FIG. 3 shows a modification of the apparatus of this invention in which a projection 17 is formed on the underside of the outer lip 3 to provide Venturi tube effect instead of the cover 7 shown in FIG. 1. Additionally, the embodiment of FIG. 3 employs the previously mentioned rectifying plate 9. Since the annular rectifying plate 9 and the outer lip 3 define an annular chamber 12 therebetween which might give rise to vibrations due to entrainment of air in the chamber 12 by air passing by the edges of the outer lip 3 and the rectifying plate 9, vent holes 13 are provided in the rectifying plate 9 to provide a source of replacement air to the chamber 12.

Figure 4:
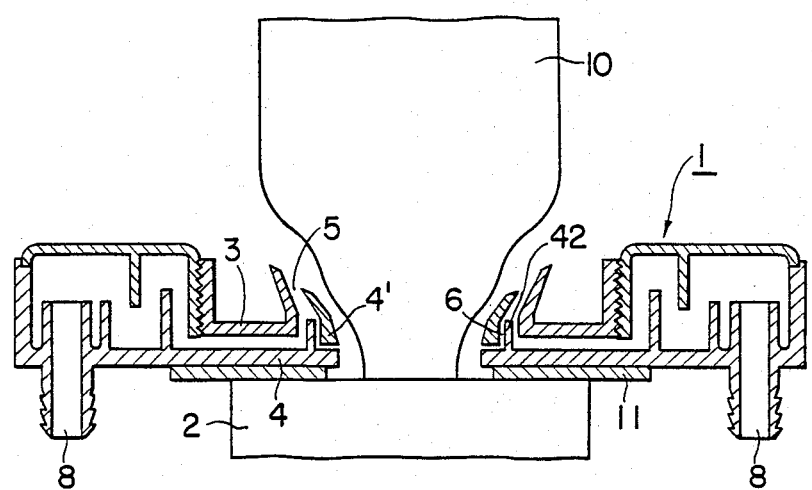

In another embodiment shown in FIG. 4, Venturi tube effect forming means is provided at a point closer to the air ejection slit 5 than the embodiment shown in FIG. 1. More particularly, an air suction passage 6 is formed between an inner flange 41 of the lower lip and an annular ring 42 surrounding the flange 41.

FIGS. 5 and 6 show still another embodiment of this invention in which the air suction passage 6 is opened in the direction of extrusion of the resin. With this construction, the air is sucked substantially in the direction of the cylindrical film so that there is no fear of impairing the stability of the cylindrical film while creating a satisfactorily reduced pressure region.

Figure 7:
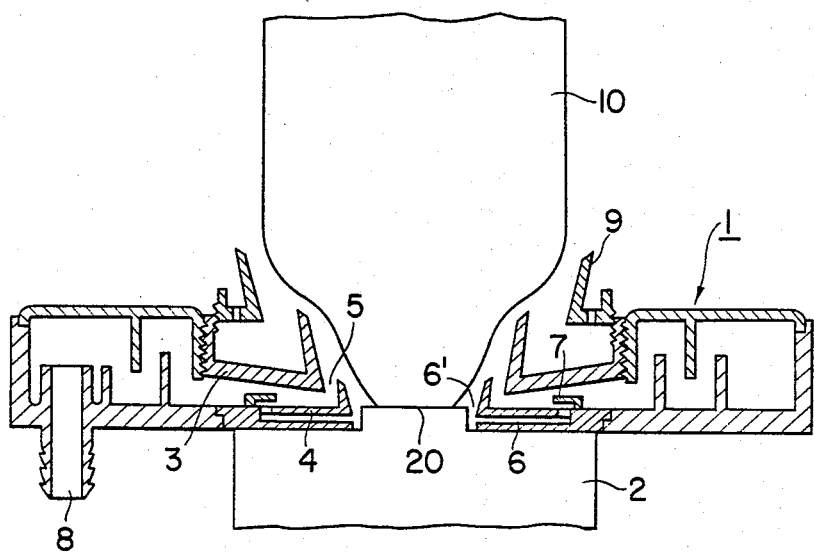
FIG. 7 is a longitudinal sectional view showing yet another embodiment of this invention.

FIG. 7 shows still another embodiment of this invention in which a projection 20 is provided at the central portion of the die 2 for supporting the air ring 1 at a level lower than the previous embodiments, whereby the opening 6' of the air suction passage 6 opens in the direction of withdrawal of the cylindrical film.

The outer lip 3 shown in FIG. 1 and other drawings is secured to the air ring 1 by threading, for example, to be movable in the vertical direction to adjust the quantity of the ejected air and the degree of pressure reduction attained by the air suction passage 6.

Where an annular rectifying plate 9 is provided above the upper lip 3, the air ejected from the slit 5 can flow more smoothly along the surface of the cylindrical film 10 to stabilize the bubble.

The side surfaces of the outer lip 3 and of the rectifying plate 9 disposed thereabove (usually also of the side surface of the inner lip) are tapered outwardly, and it is desirable that the degree of inclination of the outer lip 3 be larger than that of the inner lip 4 (i.e., closer to the horizontal) and that the degree of inclination of the rectifying plate 9 be larger than that of the outer lip 3. In other words, it is desirable to stepwise increase the degree of inclination so as to more stably inflate the cylindrical film 10.

As preferred examples of the degrees of inclination, the angle of inclination of the inner lip 4 ranges from 0° to 15° with respect to the direction of withdrawal of the cylindrical film 10, that of the outer lip 3 from 5° to 30° and that of the rectifying plate 9 from 10° to 45°.

To open the air suction passage 6 into the air flow passage as shown in FIGS. 1 through 3 for creating Venturi tube effect is a simple mechanical matter.

With the modification just described, since the extruded cylindrical film is stepwise inflated by the reduced pressure in the reduced pressure region, and a Venturi tube effect is created between the tapered surface and the cylindrical film, a high blow-up ratio can be attained. Moreover, as the cooling efficiency is high, highly transparent film can be obtained. Although the cylindrical film is attracted outwardly by the reduced pressure in the reduced pressure region and pressure reducing effect of the tapered surfaces, since air always flows continuously between the cylindrical film and the tapered surfaces, a high speed forming becomes possible.

To illustrate the advantages of this invention, the following examples are given.

EXAMPLES 1-4

Low density polyethylene NOVATEC-L, F155 (manufactured by Mitsubishi Kasei Kogyo Kabushiki Kaisha) having a melt index of 2.0 g/10 minutes at 190° C., and a density of 0.925 g/cm$^3$ was extruded at a melt temperature of 160° C. and a rate of extrusion of 18 kg/hr with an inflation forming machine (type EA-40 extruder manufactured by Modern Machinery Co. (40 mm diameter, L/D of 26 and compression ratio of 3.2) and equipped with a spiral type inflation die (lip spacing of 0.8 mm, and a circular slit diameter of 100 mm).

An air ring similar to that shown in FIG. 5 was used, and the air quantity ejected from the air ejecting slit was adjusted such that the frost line heights as shown in the following Table I was obtained. The blow-up ratio and the withdrawal speed of the cylindrical film were varied. The film forming stability, transparency of the film and the degree of pressure reduction in the air suction passage were measured. The observed film forming stability was as follows.

O: The cylindrical film was formed very stably without any appreciable wavy movement, vibration and wrinkles.

Δ: Wavy motion, vibration and wrinkles were noted.

: Wavy motion, vibration and wrinkles occurred heavily so that continuous forming of the cylindrical films was impossible.

The transparency (haze) was measured as follows.

According to Japanese Industrial Standard (JIS) K 6714, the transparency was measured with a haze meter manufactured by Nippon Denshoku Co. and expressed in haze (%).

The degree of pressure reduction in the air suction passage was measured as follows.

A fine copper tube was inserted through the air suction passage in the air ring and the copper tube was connected to a U-shaped tube filled with water colored with red ink and the difference between the pressure in the air suction passage and the atmospheric pressure was measured as the difference (mm) between the heights of water columns in the two leges of the U-shaped tube.

The height of the frost line was measured in the following manner.

The distance between a point at which the cylindrical film solidifies (frost line) and the surface of the die was measured with a measure.

CONTROL EXAMPLES 1 TO 4

Inflated cylinders were formed in the same manner as in Examples 1 to 4 except that the air ring was replaced by a conventional blow-up type air ring.

The results of Examples 1 to 4 and Control Examples 1 to 4 are shown in the following Table I.

TABLE I

|  |  | Blow-up ratio | Film thickness (μ) | Speed of withdrawal (m/min.) | Forming stability | Degree of pressure reduction (mm, water column) | Haze (%) | Height of frost line (cm) |
|---|---|---|---|---|---|---|---|---|
| Example | 1 | 1.0 | 40 | 40 | O | 2 | 5.0 | 30 |
|  | 2 | 2.0 | " | 20 | O | 7 | 3.8 | 20 |
|  | 3 | 3.0 | " | 13 | O | 6 | 3.5 | 21 |
|  | 4 | 4.5 | " | 8.8 | O | 5 | 3.5 | 22 |
| Control Example | 1 | 1.0 | 40 | 40 | O | — | 5.5 | 30 |
|  | 2 | 2.0 | " | 20 | O | — | 4.2 | 30 |
|  | 3 | 3.0 | " | 13 | Δ | — | 3.8 | 45 |
|  | 4 | 4.5 | " | 8.8 | X | — | — | — |

EXAMPLES 5-8

A linear low density polyethylene having a melt index of 1.0 g/10 minutes at 190° C. and a density of 0.920 g/cm$^3$ was extruded at a resin temperature of 260° C., an extrusion rate of 18 kg/hr and an inflation ratio of 2.0 with Delser-50 type extruder made by Modern Machinery Co., (50 mm diameter, L/D of 26, and a compression ratio of 1.8) and equipped with a spiral type inflation die (lip spacing: 2.0 mm, cylindrical slit diameter: 100 mm).

An air ring having a construction similar to that shown in FIG. 5 was used, and the quantity of air ejected from the air ejecting slit was adjusted to obtain frost lines shown in the following Table II.

The speed of withdrawal was varied to evaluate the forming stability and other physical properties.

CONTROL EXAMPLES 5 TO 8

The cylindrical films were inflated in the same manner as in Examples 5 to 8 except that a conventional blow-up type air ring was used.

The results of Examples 5 to 8 and Control Examples 5 to 8 are shown in the following Table II.

TABLE II

|  | Speed of withdrawal (m/min.) | Film thickness (μ) | Forming stability | Degree of pressure reduction (mm, water column) | Haze (%) | Height of frost line (cm) |
|---|---|---|---|---|---|---|
| Example 5 | 10 | 50 | O | 3 | 6.0 | 20 |

TABLE II-continued

|  | Speed of withdrawal (m/min.) | Film thickness (μ) | Forming stability | Degree of pressure reduction (mm, water column) | Haze (%) | Height of frost line (cm) |
|---|---|---|---|---|---|---|
|  | 6 | 40 | 12.5 | O | 4.5 | 3.0 | " |
|  | 7 | 60 | 8.3 | O | 5.5 | 2.8 | " |
|  | 8 | 100 | 5 | O | 6 | 2.8 | " |
| Control |  |  |  |  |  |  |
| Example 5 | 10 | 50 | Δ | — | 9.5 | 35 |
|  | 6 | 40 | 12.5 | X | — | — | — |
|  | 7 | 60 | 8.3 | X | — | — | — |
|  | 8 | 100 | 5 | X | — | — | — |

I claim:

1. Apparatus for forming a blown film comprising:
(a) an inflation forming die having a circular slit,
(b) an air ring surrounding the circular slit of said die and provided with an air flow passage leading to an air ejecting slit,
(c) said air ring being mounted on said die without any appreciable gap,
(d) said air ejecting slit being defined by an outer lip having a tapered surface, the inner diameter thereof increasing in a direction of withdrawal of a cylindrical film extruded through said circular slit, and an inner lip disposed closer to said die than said outer lip, and
(e) means for reducing air pressure in a space between said inner lip and said cylindrical film inwardly of said air ejecting slit, said air pressure reducing means including:
  (i) an air suction passage one end of which opens in said space and the other end of which opens in said air flow passage in said air ring and
  (ii) Venturi tube effect creating means for reducing air pressure in said space through said air suction passage.

2. The apparatus according to claim 1 wherein said air suction passage extends through said inner lip.

3. The apparatus according to claim 1 wherein said air suction passage is opened in a direction of withdrawal of said cylindrical film.

4. The apparatus according to claim 1 wherein said Venturi tube effect creating means is located in said air flow passage.

5. The apparatus according to claim 4 wherein said Venturi tube effect creating means comprises a cover plate overlying one end of said air suction passage opposite to the end opening in said space.

6. The apparatus according to claim 1 which further comprises baffle plates provided in an air flow passage leading to said air ejecting slit.

7. The apparatus according to claim 1 which further comprises an annular air flow rectifying member disposed above said outer lip to surround said blown film.

8. The apparatus according to claim 1 wherein said air suction passage extends through said inner lip, one end of said air suction passage being opened into said space while the other end is opened into an air passage disposed between said outer and inner lips and leading to said air ejection slit, and wherein said outer lip is provided with a projection on a bottom surface thereof at a position above said other end of said air suction passage.

9. The apparatus according to claim 1 wherein said air suction passage is defined by an inner flange of said inner lip and an annular ring surrounding said inner flange.

10. The apparatus according to claim 1 wherein said die is adapted to extrude a resin selected from the group consisting of a high density polyethylene and a linear low density polyethylene.

11. The apparatus according to claim 1 wherein an upward projection is provided for a central portion of said die for supporting said air ring at a lower level, whereby an opening of said air suction passage opens in the direction of withdrawal of said blown film.

12. Apparatus for forming a blown film, said apparatus comprising:
(a) an inflation forming die having a circular slit;
(b) an air ring surrounding the circular slit of said die downstream of said die and being mounted on said die without any appreciable gap between said die and said air ring, said air ring being provided with an air flow passage leading to an annular air ejecting slit, said annular air ejecting slit being defined by:
  (i) an inner lip disposed downstream of said die, whereby a first annular empty chamber is formed during the extrusion of a blown film, said first annular empty chamber being bounded at least in part by said die, said inner lip, and the exterior of said film being blown, and
  (ii) an outer lip disposed downstream of said inner lip and radially outwardly of said inner lip; and
(c) means for reducing air pressure in said first annular empty chamber, said means including:
  (i) an air suction passage one end of which opens in said first annular empty chamber and the other end of which opens in said air flow passage in said air ring and
  (ii) means for creating an under-pressure in said air suction passage, said means comprising means for creating a Venturi tube effect in said air flow passage, thereby creating an under-pressure region in said air flow passage, said air suction passage communicating with the under-pressure region in said air flow passage, thereby communicating the under-pressure in said air flow passage to said first annular empty chamber, the under-pressure in said first annular empty chamber serving to attract the exterior of said film being blown radially outwardly, whereby said film being blown is moved downstream with its diameter increased to some extent.

13. Apparatus as recited in claim 12 wherein:
(a) said inner lip is at least generally in the form of a cone diverging outwardly in the downstream direction by an angle of up to 15° and
(b) said outer lip is at least generally in the form of a cone diverging outwardly in the downstream direction by an angle of between 5° and 30°.

14. Apparatus as recited in claim 13 wherein said outer lip diverges outwardly in the downstream direction by an angle which is greater than the angle by which said inner lip diverges outwardly in the downstream direction.

15. Apparatus as recited in claim 12 wherein said first annular empty chamber is further bounded by an annular spacer disposed between said die and said air ring.

16. Apparatus as recited in claim 12 wherein said outer lip is mounted in said air ring for axial movement, whereby the width of said annular air ejecting slit can be adjusted.

17. Apparatus as recited in claim 12 wherein said air suction passage opens perpendicularly to the direction of motion of the blown film.

18. Apparatus as recited in claim 12 wherein said air suction passage has an annular opening facing in the downstream direction.

19. Apparatus as recited in claim 12 and further comprising an annular air flow rectifying member disposed downstream of said outer lip and radially outwardly of said outer lip, whereby a second annular empty chamber is formed during the extrusion of a blown film, said second annular empty chamber being bounded at least in part by said outer lip, said annular air flow rectifying member, and the exterior of the blown film.

20. Apparatus as recited in claim 19 wherein:
(a) said inner lip is at least generally in the form of a cone diverging outwardly in the downstream direction by an angle of up to 15°;
(b) said outer lip is at least generally in the form of a cone diverging outwardly in the downstream direction by an angle of between 5° and 30°; and
(c) said annular air flow rectifying member is at least generally in the form of a cone diverging outwardly in the downstream direction by an angle of between 10° and 45°.

21. Apparatus as recited in claim 20 wherein:
(a) said outer lip diverges outwardly in the downstream direction by an angle which is greater than the angle at which said inner lip diverges outwardly in the downstream direction and
(b) said annular air flow rectifying member diverges outwardly in the downstream direction by an angle which is greater than the angle by which said outer lip diverges outwardly in the downstream direction.

22. Apparatus as recited in claim 19 and further comprising a vent hole extending between said second annular empty chamber and ambient air, said vent hole providing a source of replacement air for air removed from said second annular empty chamber by the motion of the blown film.

23. Apparatus as recited in claim 19 wherein said annular air flow rectifying member is mounted for axial movement, whereby the width of said second annular empty chamber can be adjusted.

24. Apparatus as recited in claim 12 wherein:
(a) an upward projection is provided on the portion of said die containing the central slit;
(b) said air ring is supported on said die downstream of the portion of said die containing the central slit;
(c) said first annular empty chamber extends upstream of the portion of said die containing the central slit; and
(d) said air suction passage opens in said first annular empty chamber upstream of the portion of said die containing the central slit.

* * * * *